US010257525B2

(12) United States Patent
Sopka et al.

(10) Patent No.: US 10,257,525 B2
(45) Date of Patent: Apr. 9, 2019

(54) IMAGE STORAGE AND RECONSTRUCTION BASED ON SUB-IMAGES

(71) Applicant: Futurewei Technologies, Inc., Plano, TX (US)

(72) Inventors: John R. Sopka, Groton, MA (US); Kandarp Patel, Framingham, MA (US); Lei Rao, Mountain View, CA (US); Jian Li, Austin, TX (US)

(73) Assignee: Futurewei Technologies, Inc., Plano, TX (US)

( * ) Notice: Subject to any disclaimer, the term of this patent is extended or adjusted under 35 U.S.C. 154(b) by 37 days.

(21) Appl. No.: 15/339,359

(22) Filed: Oct. 31, 2016

(65) Prior Publication Data

US 2018/0124413 A1 May 3, 2018

(51) Int. Cl.
G06K 9/36 (2006.01)
H04N 19/182 (2014.01)
H04N 19/156 (2014.01)
H04N 19/17 (2014.01)
H04N 19/88 (2014.01)
H04N 1/41 (2006.01)
H04N 1/417 (2006.01)

(52) U.S. Cl.
CPC .............. H04N 19/182 (2014.11); H04N 1/41 (2013.01); H04N 1/4172 (2013.01); H04N 19/156 (2014.11); H04N 19/17 (2014.11); H04N 19/88 (2014.11)

(58) Field of Classification Search
CPC .. H04N 19/17; H04N 19/182; H04N 5/23206; H04N 5/341; G06T 2200/32; G06T 2207/10004
See application file for complete search history.

(56) References Cited

U.S. PATENT DOCUMENTS

2003/0043210 A1   3/2003   Hanks
2009/0268985 A1*  10/2009  Wong ..................... G06K 9/209
                                                        382/299
2011/0228848 A1   9/2011   Dvir et al.
2013/0120420 A1   5/2013   Schoner et al.
(Continued)

FOREIGN PATENT DOCUMENTS

CN       101662684 A    3/2010
WO         9015379 A2   12/1990

OTHER PUBLICATIONS

Huang, "Erasure Coding for Storage Applications (Part II)," 2013, 35 pages.
(Continued)

*Primary Examiner* — Euengnan Yeh
(74) *Attorney, Agent, or Firm* — Conley Rose, P.C.

(57) ABSTRACT

An apparatus comprises: a receiver configured to receive an image; and a processor coupled to the receiver and configured to: obtain pixels of the image; reorder the pixels to create reordered pixels; generate a first sub-image and a second sub-image using the reordered pixels; generate a first instruction to store the first sub-image in a first sub-image node; and generate a second instruction to store the second sub-image in a second sub-image node; and a transmitter coupled to the processor and configured to transmit the first instruction and the second instruction to a database.

18 Claims, 9 Drawing Sheets

(56) References Cited

U.S. PATENT DOCUMENTS

2017/0249354 A1* 8/2017 Lee .................. G06F 17/30383

OTHER PUBLICATIONS

Plank, "Tutorial on Erasure Coding for Storage Applications, Part 1," Feb. 12, 2013, 107 pages.
Machine Translation and Abstract of Chinese Publication No. 101662684, Mar. 3, 2010, 14 pages.
Foreign Communication From a Counterpart Application, PCT Application No. PCT/CN2017/106725, English Translation of International Search Report dated Dec. 28, 2017, 7 pages.
Foreign Communication From a Counterpart Application, PCT Application No. PCT/CN2017/106725, English Translation of Written Opinion dated Dec. 28, 2017, 4 pages.

* cited by examiner

IMAGE STORAGE AND RECONSTRUCTION BASED ON SUB-IMAGES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Cellular phones, tablet computers, laptop computers, and other smart devices are proliferating. Data usage for those smart devices is likewise increasing. For instance, users of those smart devices are taking and storing an increased number of photos, or images. Data providers must increase storage capacity and processing power to accommodate the data usage. However, increased storage capacity and processing power require additional, faster servers, which are costly. Data providers are therefore seeking to reduce the need for storage capacity while maintaining the reliability of their data storage.

SUMMARY

It is desirable to implement an image reconstruction approach that uses the properties of image data and erasure coding to both reduce the storage cost and the reconstruction cost of image reconstruction. Such an approach should further maintain the reliability of data storage, meaning that the possibility of data loss should be small or nearly non-existent. According to various embodiments of the present disclosure, embodiments for image storage and reconstruction based on sub-images are provided. The embodiments reorder pixels by adding pixel distance between adjacent pixels to make them non-adjacent, group the reordered pixels into sub-images, creates parity blocks based on the sub-images, and stores each sub-image and parity block on separate nodes. By using the sub-images, the embodiments allow a greater number of node failures while maintaining the reliability of data storage. Reconstruction of lower-resolution images allows for retrieval of a subset of all sub-images, which lowers the reconstruction cost.

In one embodiment, the disclosure includes an apparatus comprising: a receiver configured to receive an image; and a processor coupled to the receiver and configured to: obtain pixels of the image; reorder the pixels to create reordered pixels; generate a first sub-image and a second sub-image using the reordered pixels; generate a first instruction to store the first sub-image in a first sub-image node; and generate a second instruction to store the second sub-image in a second sub-image node; and a transmitter coupled to the processor and configured to transmit the first instruction and the second instruction to a database. In some embodiments, the pixels comprise a first pixel, a second pixel, and a third pixel, wherein the second pixel is adjacent to the first pixel, wherein the third pixel is adjacent to the second pixel but not adjacent to the first pixel, and wherein the processor is further configured to further generate the first sub-image using the first pixel and the third pixel; the pixels further comprise a fourth pixel and a fifth pixel, wherein the fourth pixel is adjacent to the first pixel, wherein the fifth pixel is adjacent to the fourth pixel but not the first pixel, and wherein the processor is further configured to further generate the first sub-image using the fifth pixel; the processor is further configured to: generate a parity block using the first sub-image, the second sub-image, and a code; and generate a third instruction to store the parity block in a parity node; the code is an RS code, a pyramid code, or a replication code; the transmitter is further configured to transmit the third instruction to the database; the receiver is further configured to receive an RRF, and wherein the processor is further configured to generate a number of sub-images equal to the RRF; the processor is further configured to determine an RRF based on resources available in the database, a user's data plan, or other criteria, and wherein the processor is further configured to generate a number of sub-images equal to the RRF.

In another embodiment, the disclosure includes a method comprising: receiving an image; obtaining pixels of the image; reordering the pixels to create reordered pixels; generating a first sub-image and a second sub-image using the reordered pixels; generating a first instruction to store the first sub-image in a first sub-image node; generating a second instruction to store the second sub-image in a second sub-image node; and transmitting the first instruction and the second instruction to a database. In some embodiments, the pixels comprise a first pixel, a second pixel, and a third pixel, wherein the second pixel is adjacent to the first pixel, wherein the third pixel is adjacent to the second pixel but not adjacent to the first pixel, and wherein the method further comprises further generating the first sub-image using the first pixel and the third pixel; the pixels further comprise a fourth pixel and a fifth pixel, wherein the fourth pixel is adjacent to the first pixel, wherein the fifth pixel is adjacent to the fourth pixel but not the first pixel, and wherein the method further comprises further generating the first sub-image using the fifth pixel; the method further comprises: generating a parity block using the first sub-image, the second sub-image, and a code; and generating a third instruction to store the parity block in a parity node; the code is an RS code, a pyramid code, or a replication code; the method further comprises transmitting the third instruction to the database; the method further comprises: receiving an RRF; and generating a number of sub-images equal to the RRF; the method further comprises determining an RRF based on resources available in the database, a user's data plan, or other criteria; and generating a number of sub-images equal to the RRF.

In yet another embodiment, the disclosure includes an apparatus comprising: a receiver configured to receive a request for an image; a processor coupled to the receiver and configured to: determine, based on a resolution, a subset of sub-images corresponding to the image; and generate an instruction to retrieve the subset; and a transmitter coupled to the processor and configured to transmit the instruction to a database, wherein the receiver is further configured to receive the subset from the database in response to the instruction, wherein the processor is further configured to reconstruct the image using the subset, and wherein the transmitter is further configured to transmit the image in response to the request. In some embodiments, the request comprises the resolution; the processor is further configured to determine the resolution based on resources available in the database, a user's data plan, or other criteria; the processor is further configured to: retrieve an LUT corresponding to the image; read the LUT; and determine the subset based on the LUT and the resolution.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following acronyms and initialisms apply:
ASIC: application-specific integrated circuit
CPU: central processing unit
DSP: digital signal processor
EO: electrical-to-optical
FPGA: field-programmable gate array
LAN: local area network
LUT: look-up table
MDS: maximum distance separable
OE: optical-to-electrical
PDF: pixel density factor
RAM: random-access memory
ROM: read-only memory
RRF: resolution reduction factor
RS: Reed-Solomon
RX: receiver unit
SRAM: static RAM
TCAM: ternary content-addressable memory
TX: transmitter unit
WAN: wide area network.

Data storage service providers may perform data storage management through a variety of techniques. One such technique uses erasure codes to optimize the memory space utilization and data recovery. The erasure codes optimize the memory storage space by removing the need to produce replicates and further remove the need to store the replicates of each data file in the data storage.

Figure 1:
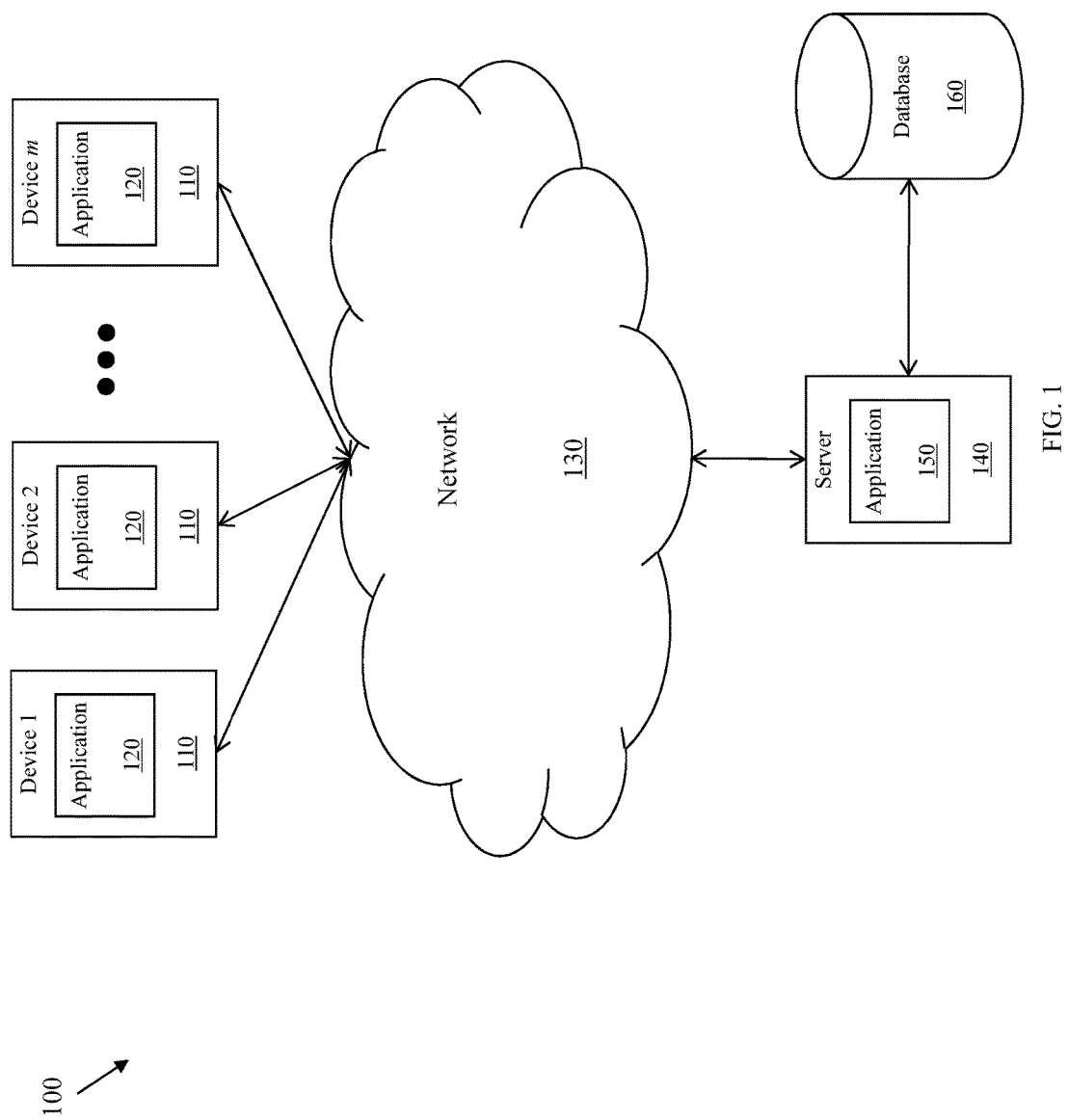
FIG. 1 is a schematic diagram of a data storage network.

FIG. 1 is a schematic diagram of a data storage network 100. The network comprises m devices 110, a network 130, a server 140, and a database 160. M is a positive integer. The data storage network 100 facilitates storage of data for the devices 110.

The devices 110 may be mobile phones, tablet computers, notebooks, or other network-enabled devices. The devices 110 communicate data, including images. The devices 110 comprise an application 120. The application 120 interacts with the server 140 to instruct storage of the data. Such storage may be referred to as cloud storage.

The network 130 enables communication between the devices 110 on the one hand and the server 140 on the other hand. The network 130 is a LAN, a WAN, a mobile phone network, the Internet, or another suitable network. Because the network 130 enables such communication and therefore enables cloud storage, the network 130 may be referred to as the cloud.

The server 140 is any hardware server. The server 140 comprises an application 150. The application 150 instructs the database 160 to store the data from the devices 110. The application 150 is the same as the application 120, a server-based version of the application 120, or different from the application 120.

The database 160 is any database suitable for storing the data from the devices 110. The database 160 is a stand-alone database or a logical partition of a larger database. Alternatively, the database 160 is a distributed database comprising a plurality of nodes, which are any combination of logical nodes and physical nodes, the latter of which may be in the same physical location or in separate physical locations.

In operation, the devices 110 communicate data among each other and store that data. For instance, device 1 110 creates an image and transmits the image to device 2 110. Device 2 110 displays the image for a user of device 2 110. Using the application 120, the user instructs device 2 110 to store the image in the cloud. Device 2 110 transmits the image to the server 140 through the network 130. The server 140, via the application 150, instructs the database 160 to store the image. Finally, the database 160 stores the image. Using the application 120, the user may instruct device 2 110 to retrieve the image from the server 140 at any time.

Figure 2:
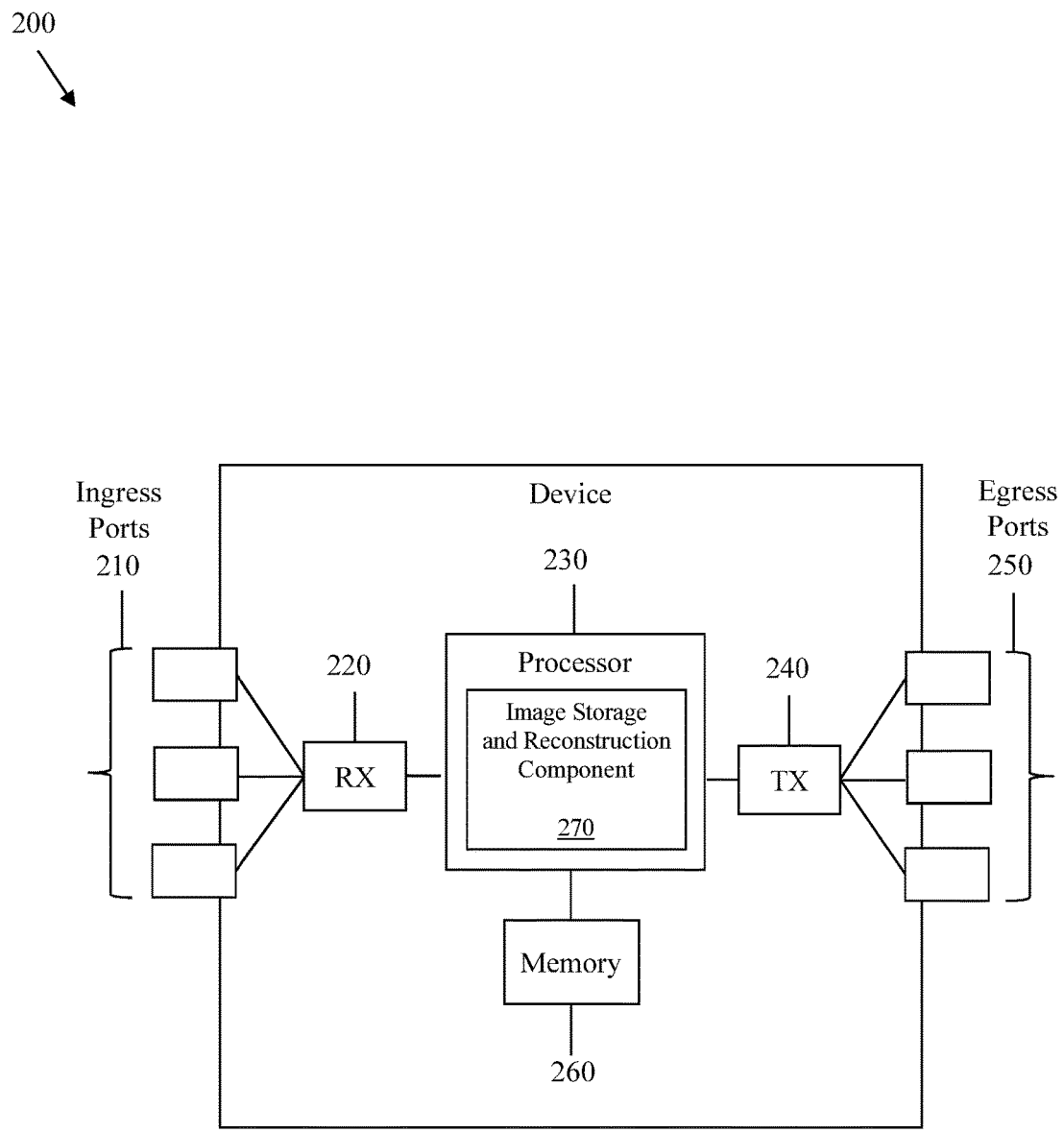
FIG. 2 is a schematic diagram of a device.

FIG. 2 is a schematic diagram of a device 200. The device 200 may implement the disclosed embodiments, for instance the devices 110 and the server 140. The device 200 comprises ingress ports 210 and a RX 220 for receiving data; a processor, logic unit, or CPU 230 to process the data; a TX 240 and egress ports 250 for transmitting the data; and a memory 260 for storing the data. The device 200 may also comprises OE components and EO components coupled to the ingress ports 210, the RX 220, the TX 240, and the egress ports 250 for ingress or egress of optical or electrical signals.

The processor 230 is any suitable combination of hardware, middleware, firmware, and software. The processor 230 comprises any combination of one or more CPU chips, cores, FPGAs, ASICs, or DSPs. The processor 230 communicates with the ingress ports 210, RX 220, TX 240, egress ports 250, and memory 260. The processor 230 comprises an image storage and reconstruction component 270, which implements the disclosed embodiments. The inclusion of the component 270 therefore provides a substantial improvement to the functionality of the device 200 and effects a transformation of the device 200 to a different state. Alternatively, the memory 260 stores the component 270 as instructions, and the processor 230 executes those instructions. Further in the alternative, the device 200 comprises other means to implement the embodiments.

The memory 260 comprises one or more disks, tape drives, and solid-state drives. The device 200 may use the memory 260 as an over-flow data storage device to store programs when the device 200 selects those programs for execution and to store instructions and data that the device 200 reads during execution of those programs. The memory 260 may be volatile or non-volatile and may be any combination of ROM, RAM, TCAM, or SRAM.

Figure 3:
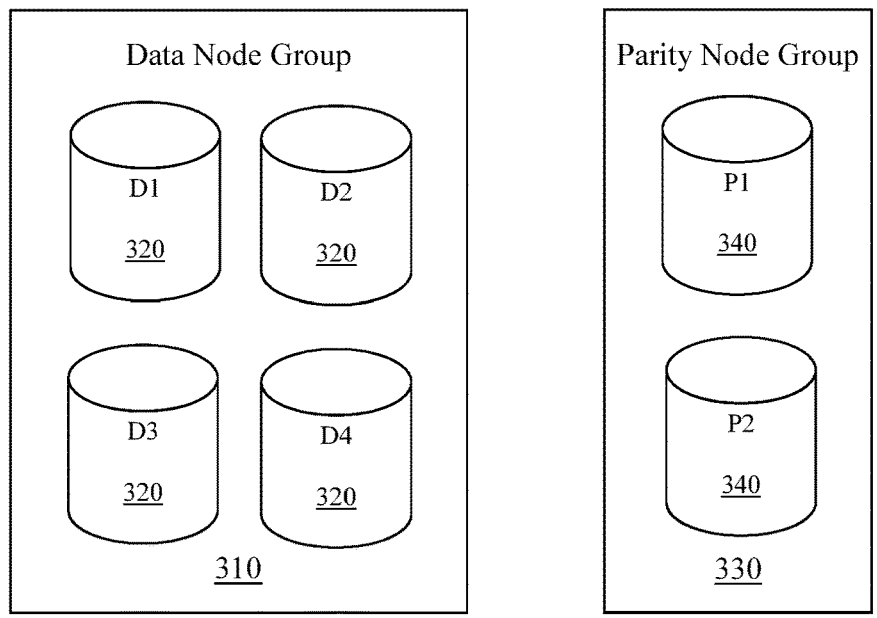
FIG. 3 is a schematic diagram of a database.

FIG. 3 is a schematic diagram of a database 300. The database 300 may be or may be implemented in the database 160 in FIG. 1. The database 300 comprises a data node group 310 and a parity node group 330. The data node group 310 comprises k=4 data nodes D1-D4 320. The parity node group 330 comprises j=2 parity nodes P1-P2 340. Along with the server 140, the database 300 implements erasure coding. Erasure coding is a method of data protection in which data are divided into fragments, the fragments are encoded with parity blocks, and the fragments and parity blocks are stored in different locations.

For instance, the server 140 obtains pixels D1-D4 of an image and instructs the database 300 to store those pixels in respective data nodes D1-D4 320. The server 140 generates a parity block P1 by adding the pixels D1 and D2, generates a parity block P2 by adding the pixels D3 and D4, and instructs the database 300 to store the parity blocks P1-P2 in their respective parity nodes P1-P2 340. If the data node D1 320 fails or otherwise becomes unavailable and if the device 1 110 requests the image from the server 140, then the server 140 subtracts the pixel D2 from the parity block P1 to reconstruct the pixel D1, reconstructs the image from the pixels D1-D4, and transmits the image to the device 1 110. For the database 300, the server 140 may reconstruct the image when there are up to j simultaneous failures of the data nodes D1-D4 320.

Figure 4:
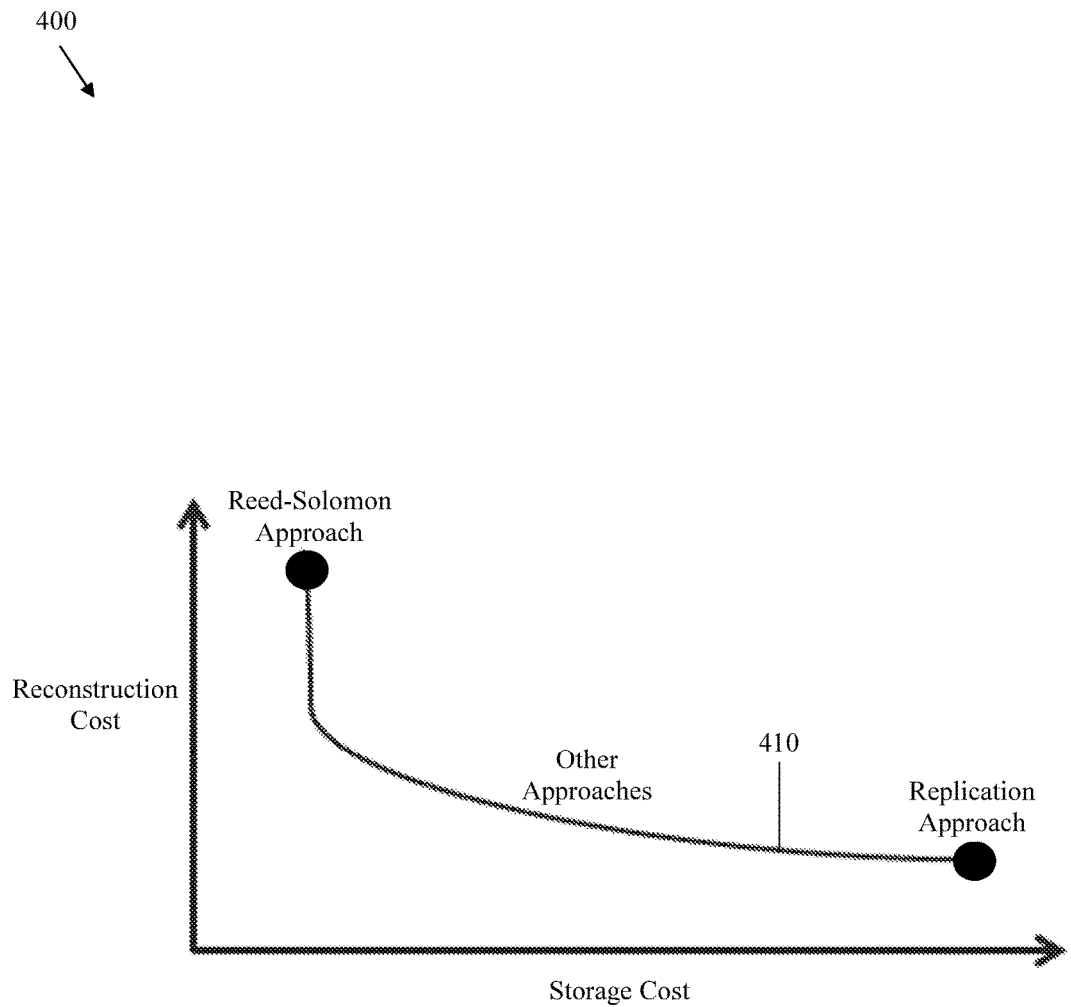
FIG. 4 is a graph of reconstruction cost versus storage cost for various erasure coding approaches.

FIG. 4 is a graph 400 of reconstruction cost versus storage cost for various erasure coding approaches. The x-axis represents storage cost in arbitrary units such as terabytes, and the y-axis represents reconstruction cost in arbitrary units such as instructions. The graph 400 comprises a curve 410 with two points, a first point representing an RS approach and a second point representing a replication approach.

The RS approach is described in James S. Plank, "Tutorial on Erasure Coding for Storage Applications, Part 1," Feb. 12, 2013 ("Plank"), which is incorporated by reference. The RS approach implements RS encoding to generate a relatively smaller number of parity blocks, which a server stores on separate parity nodes. The RS approach therefore requires relatively less storage space, so the first point on the curve 410 indicates a relatively lower storage cost. However, the RS approach requires relatively more computation to reconstruct pixels due to the RS encoding, so the first point on the curve 410 indicates a relatively higher reconstruction cost.

In contrast, the replication approach generates parity blocks by simply replicating pixels, so the number of parity blocks and thus parity nodes is the same as the number of pixels. The reconstruction approach therefore requires relatively more storage space, so the second point on the curve 410 indicates a relatively high storage cost. However, the replication approach requires relatively less computation to reconstruct pixels because the pixels are replicated, albeit in the parity nodes, so the second point on the curve 410 indicates a relatively lower reconstruction cost.

Other approaches are in between the RS approach and the replication approach on the curve 410. However, it is desirable to implement an image reconstruction approach that uses the properties of image data and erasure coding to both reduce the storage cost and the reconstruction cost of image reconstruction. Such an approach should further maintain the reliability of data storage, meaning that the possibility of data loss should be small or non-existent.

Disclosed herein are embodiments for image storage and reconstruction based on sub-images. The embodiments reorder pixels by adding pixel distance between adjacent pixels to make them non-adjacent, group the reordered pixels into sub-images, create parity blocks based on the sub-images, and store each sub-image and parity block on separate nodes. By using the sub-images, the embodiments allow a greater number of node failures while maintaining the reliability of data storage. Reconstruction of lower-resolution images allows for retrieval of a subset of all sub-images, which lowers the reconstruction cost.

Figure 5:
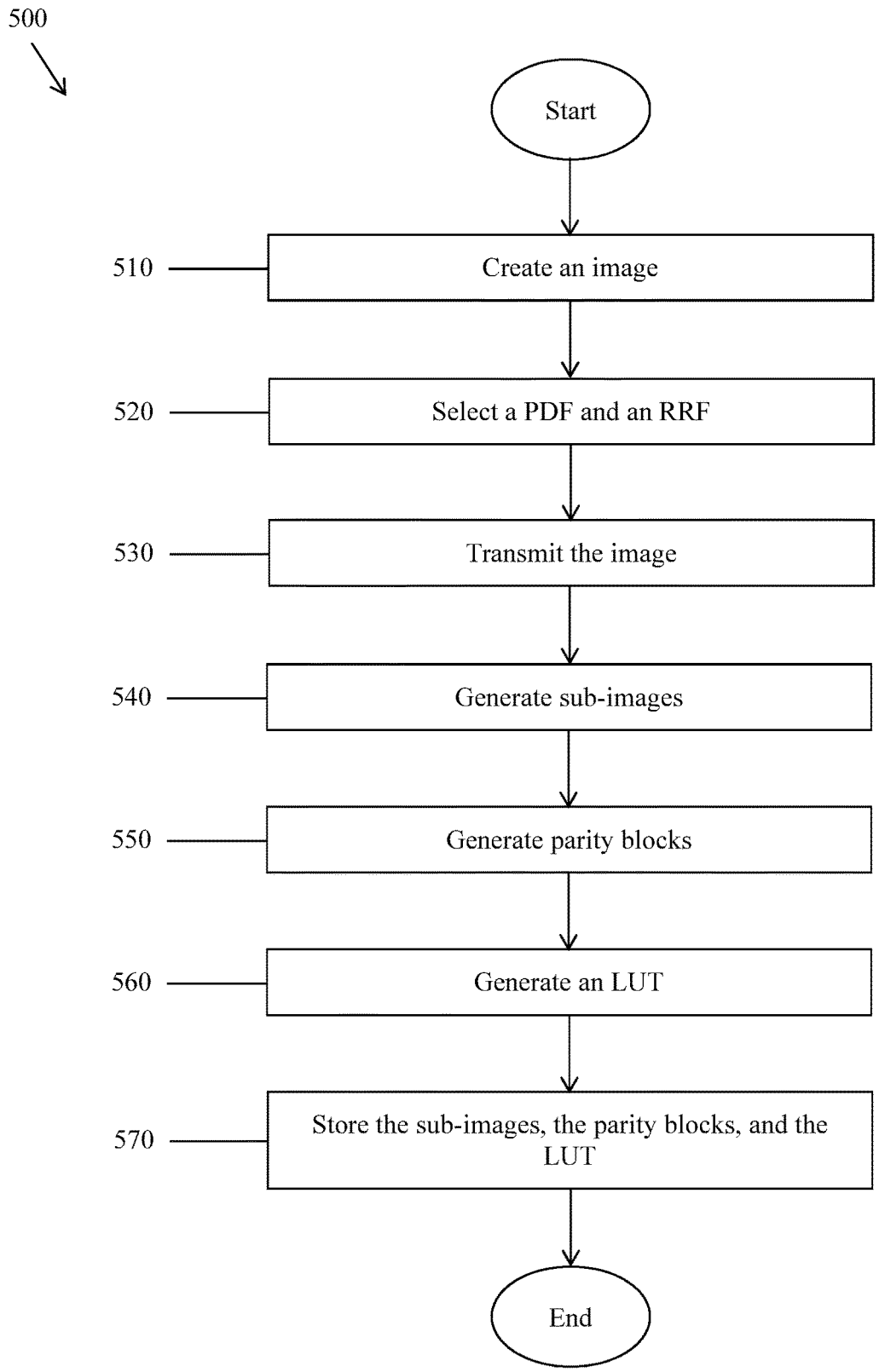
FIG. 5 is a flowchart illustrating a method of image storage according to an embodiment of the disclosure.

FIG. 5 is a flowchart illustrating a method 500 of image storage according to an embodiment of the disclosure. One of the devices 110, the server 140, and the database 160 implement the method 500. At step 510, the device 110 an image is created. For instance, a user of the device 110 uses a camera on the device 110 to take a photo.

At step 520, a PDF and an RRF are selected. The PDF is represented as x and is equal to a power of pixels in a length and a width of each sub-image of the image. The sub-images are described further below. Thus, a PDF of x=3 yields sub-images that are $3^2$ pixels long, $3^2$ pixels wide, and 81 pixels total. The server 140 determines the PDF based on resources available in the database 160 or other criteria. Alternatively, the application 120 provides an interactive feature for the user to select the PDF.

The RRF is represented as k and is equal to an integer number of sub-images the server 140 divides the image into as described below. A high RRF yields a lower resolution and ensures that, if a sub-image is unavailable due to failure of a data node, then the remaining sub-images in the functioning data nodes can provide a clear image after reconstruction of the image. The application 120 translates the RRF into words such as "lowest resolution," "medium resolution," and "highest resolution" and provides those options to the user; the application 120 provides a sliding scale for the RRF; or the application 120 provides another interactive feature for the user to select the RRF. Alternatively, the server 140 determines the RRF based on the resources available in the database 160, the user's data plan, or other criteria.

At step 530, the image is transmitted. For instance, the device 110 transmits the image with the PDF and the RRF to the server 140 via the network 130. At step 540, sub-images are generated. For instance, the server 140 generates the sub-images. The server 140 does so by dividing the image into k sub-images, where each sub-image comprises $2^x \times 2^x$ pixels. A row value p represents a row of the image which a pixel is in, and a column value q represents a column of the image which the pixel is in. Thus, each sub-image comprises pixels satisfying the following equation:

$$s = (p-1) * 2^x + q, \quad (1)$$

where s is a value up to k. More specifically, the server 140 generates the sub-images using the following pseudo code:

```
get x
get k
//number of pixels in the image = (p * q * 2ˣ) (p * q * 2ˣ)
//number of sub-images = k
//number of pixels in each sub-image = p * q
initiate a counter i at 0
for (i = 1; i ≤ 2ˣ; i++)
{
  for (p = 1; p ≤ 2ˣ; p++)
  {
    for (q = 1; q ≤ 2ˣ; q++)
    {
      NewImage(i) = OriginalImage[(p-1) * I + q][(p - 1)* i + q]
    }
  }
}
```

I is a counter. The new image is denoted as NewImage(i), and the original image is denoted as OfiginalImage. The operand after OriginalImage creates a distance between pixels in each sub-image by reordering the pixels.

At step 550, parity blocks are generated. For instance, the server 140 generates the parity blocks using an RS code, a pyramid code, a replication code, or another suitable parity block generation code described in, for instance, Plank or Cheng Huang, "Erasure Coding for Storage Applications (Part II)," 2013, which is incorporated by reference. Both step 540 and step 550 are described further below with respect to FIG. 6.

Figure 6:
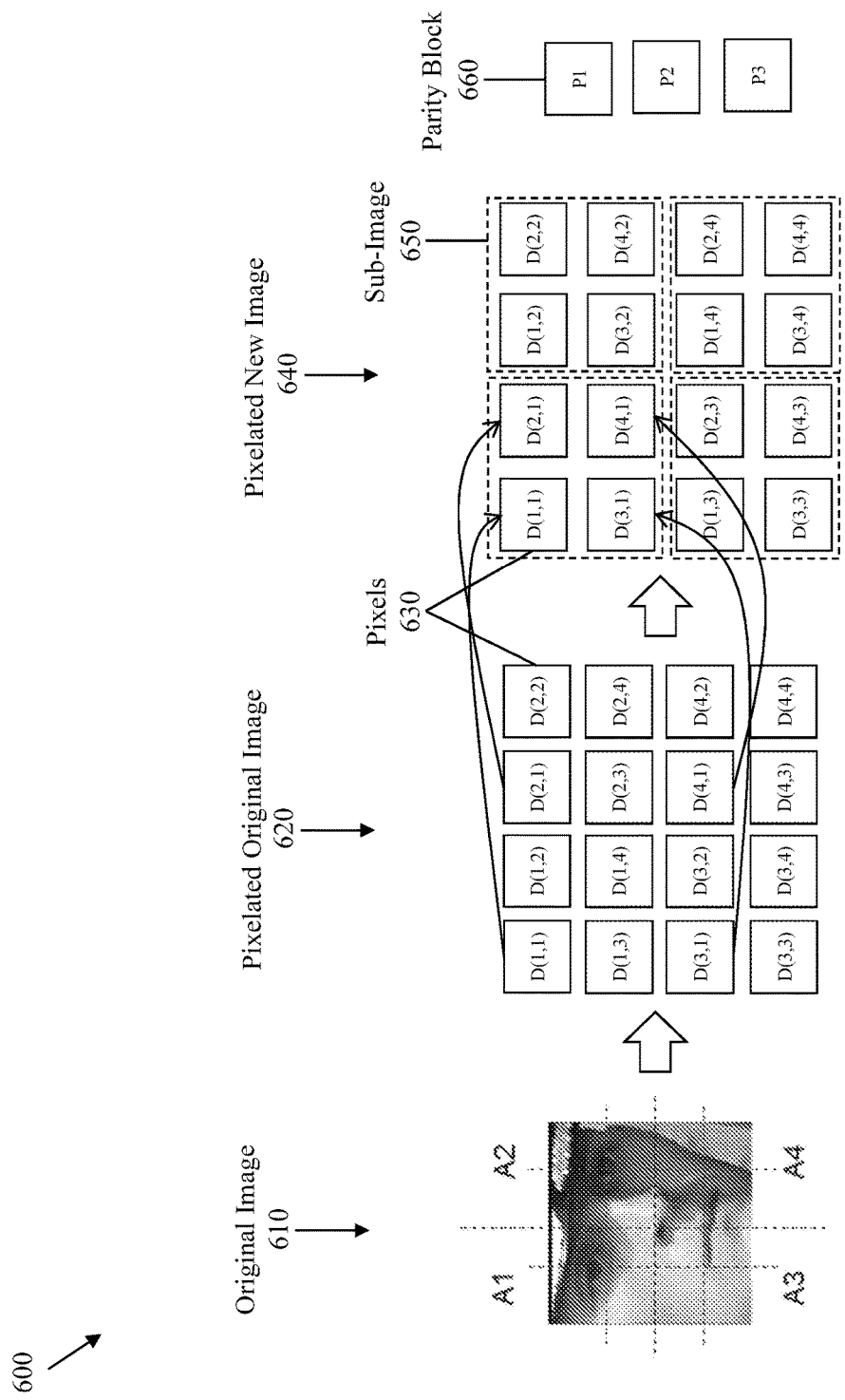
FIG. 6 is a diagram illustrating an example of sub-image generation and parity block generation according to an embodiment of the disclosure.

FIG. 6 is a diagram 600 illustrating an example of sub-image generation and parity block generation according to an embodiment of the disclosure. The sub-image generation corresponds to step 540, and the parity block generation corresponds to step 550. The diagram 600 comprises an original image 610, a pixelated original image 620, and a pixelated new image 640. The original image 610 is a picture of a soldier and comprises grid lines delineating four quadrants, D1, D2, D3, and D4. The server 140 obtains pixels of the original image 610 as shown in the pixelated original image 620.

The pixelated original image 620 comprises pixels 630 representing the original image 610 and denoting their relationships to the quadrants. Specifically, the first number denoted in each pixel 630 represents the quadrant the pixel 630 is located in and the second number represents the pixel order of the pixel 630 in that quadrant. Thus, the top-left pixel 630 is denoted as D(1,1) because it is in quadrant D1 and is the first pixel 630 in the first quadrant. Similarly, the top-right pixel 630 is denoted as D(2,2) because it is in quadrant D2 and is the second pixel 630 in quadrant D2, and the pixel 630 below that is denoted as D(2,4) because it is in quadrant D2 and is the fourth pixel 630 in quadrant D2. In prior approaches, the server 140 stores each pixel 630 in separate data nodes or stores sets of adjacent pixels, for instance pixels D(1,1), D(1,2), D(1,3), and D(1,4), in separate data nodes.

The pixelated new image 640 comprises the pixels 630. However, for the pixelated new image 640, the server 140 reorders the pixels 630 using the pseudo code above. For instance, the server 140 reorders pixel D(2,1) to the position of pixel D(1,2) and reorders pixel D(4,1) to the position of pixel D(1,4) as shown by the arrows. Thus, the server 140 adds pixel distance between adjacent pixels 630 to make them non-adjacent. Pixel D(1,1) and pixel D(3,1) remain in their positions as also shown by the arrows. The server 140 then groups the reordered pixels into sub-images 650. In the diagram 600, k=4, so there are four sub-images 650. The top-left sub-image 650 comprises the top-left pixels 630 from each quadrant, namely pixels D(1,1), D(2,1), D(3,1), and D(4,1); the top-right sub-image 650 comprises the top-right pixels 630 from each quadrant, namely pixels D(1,2), D(2,2), D(3,2), and D(4,2); the bottom-left sub-image 650 comprises the bottom-left pixels 630 from each quadrant, namely pixels D(1,3), D(2,3), D(3,3), and D(4,3); and the bottom-right sub-image 650 comprises the bottom-right pixels 630 from each quadrant, namely pixels D(1,4), D(2,4), D(3,4), and D(4,4). In this approach, the server 140 stores each sub-image 650 of reordered pixels 630 in separate data nodes.

The server 140 may store each sub-image 650 of reordered pixels 630 in separate data nodes because images typically comprise redundancies or near-redundancies. For instance, quadrant D3 in the original image 610 contains mostly white or peach pixels 630. Consequently, if enough data nodes were to fail so that parity nodes were unable to fully facilitate image reconstruction, then the server 140 could reconstruct the image with relatively less distortion.

In addition, the server 140 generates j=3 parity blocks 660. The diagram 600 illustrates an example where j=3, but j may vary depending on a parity block generation code that the server 140 implements, a storage capacity of the database 160, a redundancy requirement that the server 140 imposes, or other criteria. The parity blocks 660 are denoted as P1, P2, and P3. The server 140 generates parity block P1 based on an encoding of pixels D(m,1) and D(m,2), generates parity block P2 based on an encoding of pixels D(m,3) and D(m,4), and generates parity block P3 based on an encoding of pixels D(m,n), where m and n are integers corresponding to the quadrants and the pixel orders described above. For instance, the server 140 generates parity block P1 based on an encoding of pixels D(1,1), D(2,1), D(3,1), D(4,1), which make up the top-left sub-image 650, and pixels D(1,2), D(2,2), D(3,2), and D(4,2), which make up the top-right sub-image 650. The server 140 generates parity block P1 based on an encoding of pixels D(1,3), D(2,3), D(3,3), and D(4,3), which make up the bottom-left sub-image 650, and pixels D(1,4), D(2,4), D(3,4), and D(4,4), which make up the bottom-right sub-image 650. The server 140 generates parity block P3 based on all four sub-images 650. Because of the distance among the pixels 630 in the pixelated new image 640, the parity blocks 660 are MDS parity blocks.

Returning to FIG. 5, at step 560, an LUT is generated. For instance, the server 140 generates the LUT shown in Table 1.

TABLE 1

| LUT | |
| --- | --- |
| Field | Value |
| Sub-Image Order | |
| RRF | |
| Resolution Instruction | |
| Node Map | |

As shown, the LUT comprises sub-image order, RRF, sub-image list, and node map fields. The sub-image order field describes the relative order, or position, of the sub-images. For instance, in FIG. 6, the top-left sub-image 650 is sub-image 1, the top-right sub-image 650 is sub-image 2, the bottom-left sub-image 650 is sub-image 3, and the bottom-right sub-image 650 is sub-image 4. The RRF field comprises the RRF determined at step 520. The resolution instruction field comprises a list of which sub-images 650 correspond to each resolution and how the sub-images 650 should be combined for each resolution. The node map field comprises a map of which nodes comprise which sub-images 650, which nodes comprise which parity blocks, and which node comprises the LUT. The server 140 itself stores a pointer indicating which node comprises the LUT for each image.

Finally, at step 570, the sub-images, the parity blocks, and the LUT are stored. For instance, the server 140 instructs the database 160 to store each of the k sub-images in a separate node, each of the j parity blocks in a separate node, and the LUT in a separate node. Step 570 is described further below with respect to FIG. 7.

Figure 7:
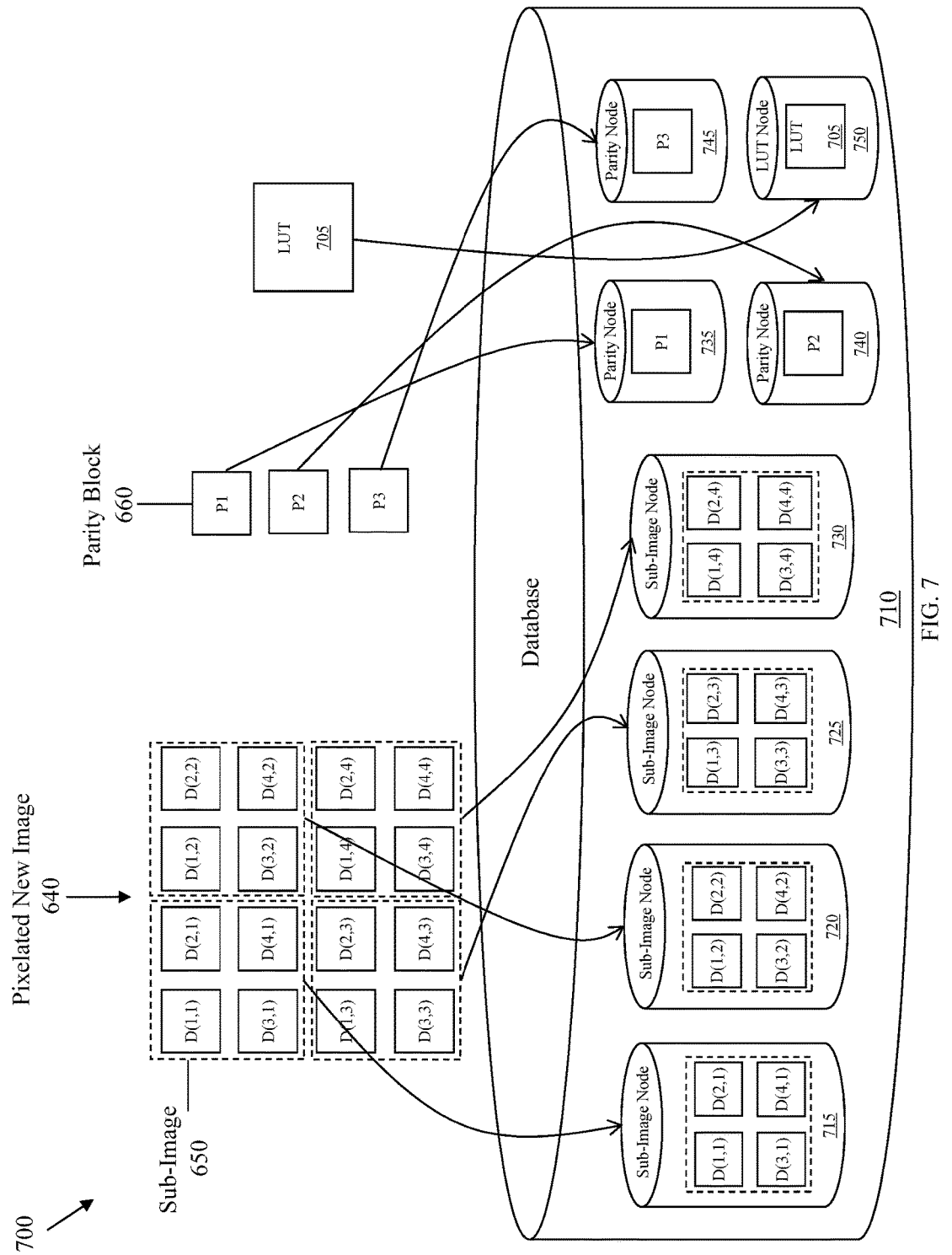
FIG. 7 is a diagram illustrating an example of sub-image, parity block, and LUT storage according to an embodiment of the disclosure.

FIG. 7 is a diagram 700 illustrating an example of sub-image, parity block, and LUT storage according to an embodiment of the disclosure. The diagram 700 follows the example illustrated in the diagram 600 in FIG. 6. The diagram 700 comprises the pixelated new image 640, the parity blocks 660, an LUT 705, and a database 710. The LUT 705 is the LUT described in step 570 in FIG. 5 and shown in Table 1. The database 710 may implement the database 160 in FIG. 1. The database 710 comprises sub-image nodes 715, 720, 725, 730; parity nodes 735, 740, 745; and an LUT node 750.

The server 140 instructs the database 710 to store sub-image 1 in the sub-image node 715, sub-image 2 in the sub-image node 720, sub-image 3 in the sub-image node 725, sub-image 4 in the sub-image node 730, parity block P1 in the parity node 735, parity block P2 in the parity node 740, parity block P3 in the parity node 745, and the LUT 705 in the LUT node 750. If any of the sub-image nodes 715, 720, 725, 730 fail, then the server 140 may reconstruct the image using the LUT 705, the remaining sub-images, and the corresponding parity blocks 660 and implementing the pseudo code above. For the database 710, the server 140 may reconstruct the image when there are up to j+ε simultaneous failures of the data nodes D1-D4 320, where ε<k.

Figure 8:
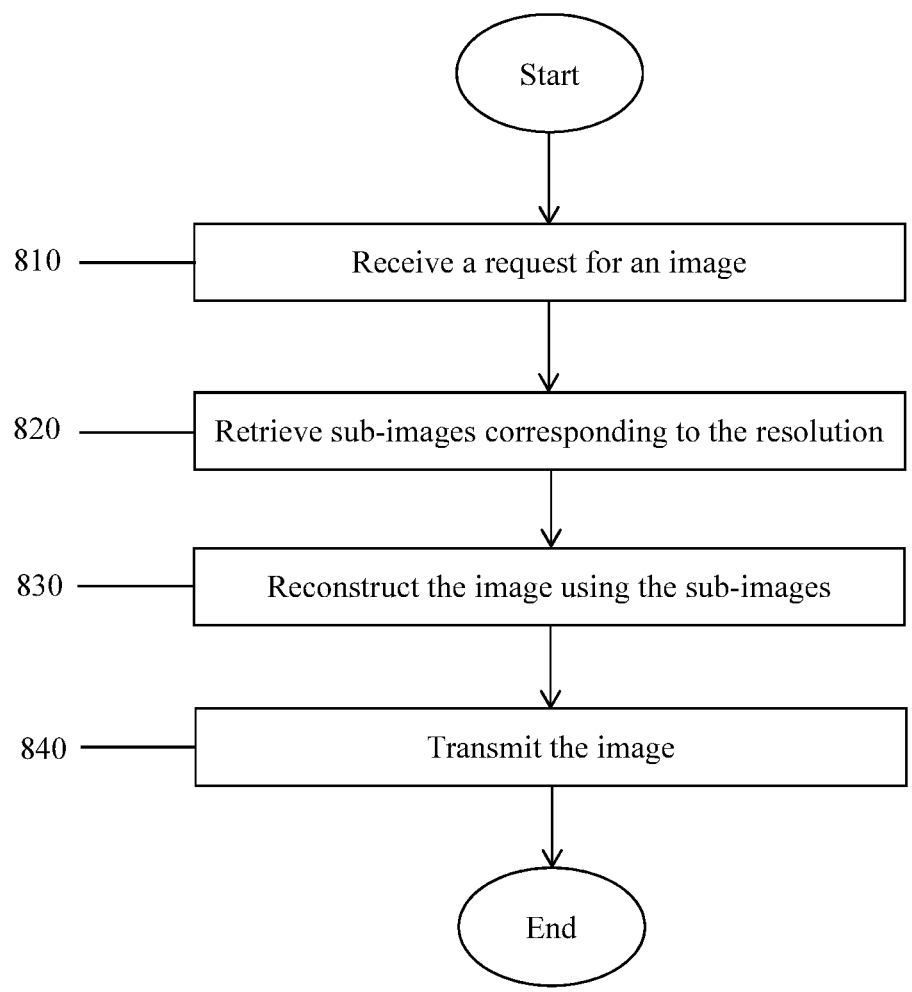
FIG. 8 is a flowchart illustrating a method of resolution-based image reconstruction according to an embodiment of the disclosure.

FIG. 8 is a flowchart illustrating a method 800 of resolution-based image reconstruction according to an embodiment of the disclosure. One of the devices 110, the server 140, and the database 160 implement the method 800. At step 810, a request for an image is received. For instance, the server 140 receives the request from one of the device 110, and the request comprises a resolution. The application 120 provides an interactive feature for the user to select the resolution. Alternatively, the server 140 determines the resolution based on the resources available in the database 160, a user's data plan, or other criteria.

At step 820, sub-images corresponding to the resolution are retrieved. For instance, the server 140 retrieves the LUT 705 from the LUT node 750, reads the LUT 705, and determines, from the LUT 705 and based on the resolution, which sub-images 650 to retrieve. Those sub-images 650 may make up a subset of the sub-images 650. For instance, resolution of 1 indicates that the server 140 should retrieve all k sub-images 650, a resolution of ½ indicates that the server 140 should retrieve one out of each four sub-images 650, and a resolution of 1/k indicates that the server 140 should retrieve one of the k sub-images 650.

At step 830, the image is reconstructed using the sub-images. For instance, the server 140 reconstructs the image by extracting the pixels from the sub-images, placing those pixels in their original locations, replicating those pixels in sub-regions corresponding to the sub-images. For instance, looking at FIG. 6 and applying a resolution of 1/k, first, the server 140 extracts pixels D(1,1), D(2,1), D(3,1), and D(4,1) from the top-left sub-image 650. Second, the server 140 places those pixels in their original locations from the pixelated original image 620. Third, the server replicates those pixels in corresponding sub-regions. Thus, the server 140 replicates pixel D(1,1) in locations (1,2), (1,3), and (1,4); replicates pixel D(2,1) in locations (2,2), (2,3), and (2,4); replicates pixel D(3,1) in locations (3,2), (3,3), and (3,4); and replicates pixel D(4,1) in locations (4,2), (4,3), and (4,4). In prior approaches, the server 140 retrieve all pixels, then reconstructs a lower-resolution image from all of the pixels. In contrast, for this approach, the server 140 retrieves only a subset of the pixels corresponding to the retrieved sub-images, then reconstructs a lower-resolution from the subset of the pixels. The latter approach reduces the reconstruction cost. Finally, at step 840, the image is transmitted. For instance, the server 140 transmits the image to the device 110.

Figure 9:
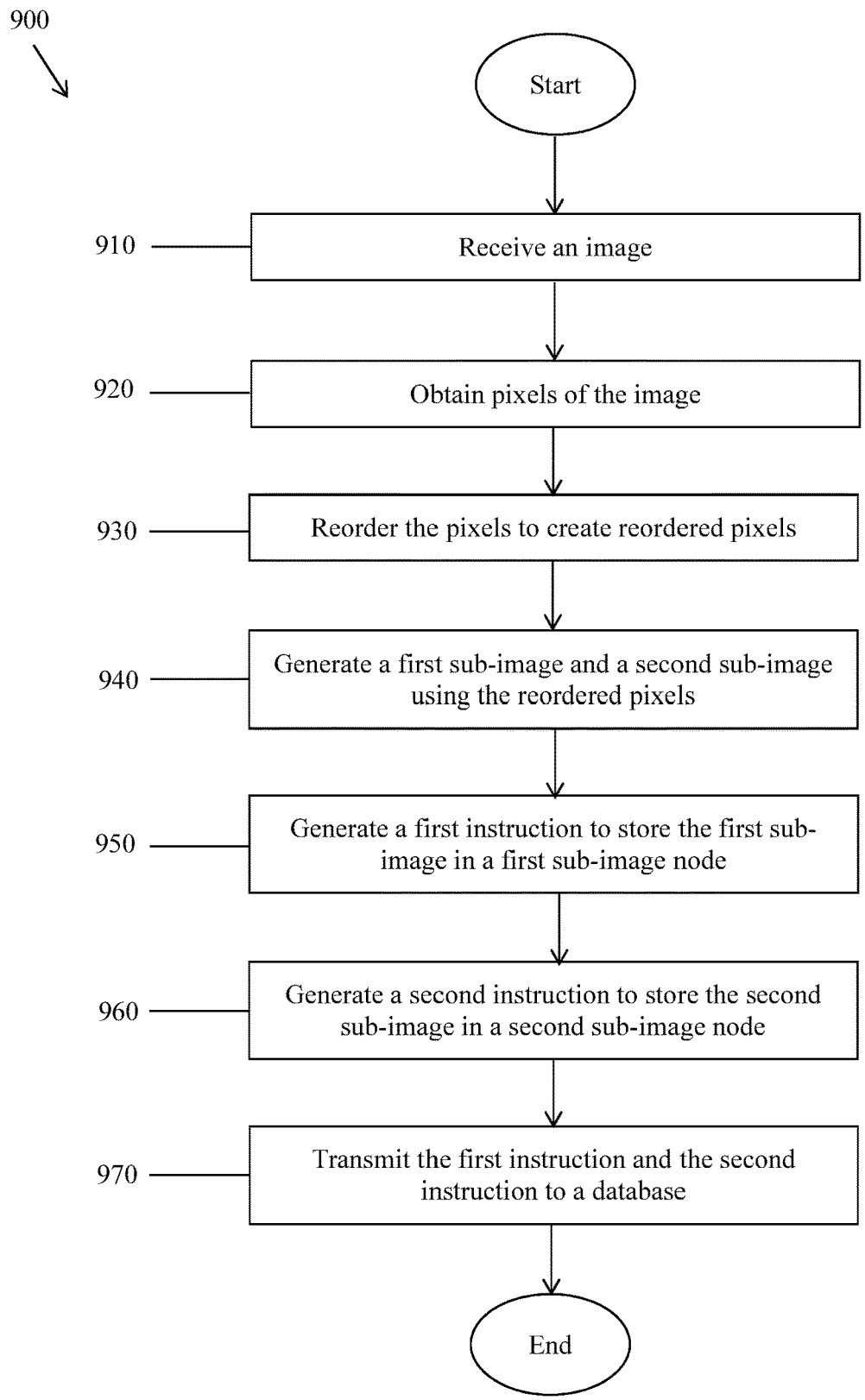
FIG. 9 is a flowchart illustrating a method of image storage according to an embodiment of the disclosure.

FIG. 9 is a flowchart illustrating a method 900 of image storage according to an embodiment of the disclosure. The server 140 implements the method 900. At step 910, an image is receiver. For instance, the server 140 receives the original image 610. At step 920, pixels of the image are obtained. For instance, the server 140 obtains the pixels 630 of the original image 610 as shown in the pixelated original image 620. At step 930, the pixels are reordered to create reordered pixels. For instance, the server 140 reorders the pixels 630 as shown in the pixelated new image 640.

At step 940, a first sub-image and a second sub-image are generated using the reordered pixels. For instance, the server 140 generates the top-left sub-image 650 and the top-right sub-image 650. At step 950, a first instruction to store the first sub-image in a first sub-image node is generated. For instance, the server 140 generates a first instruction instructing the database 710 to store the top-left sub-image 650 in the sub-image node 715. At step 960, a second instruction to store the second sub-image in a second sub-image node is generated. For instance, the server 140 generates a first instruction instructing the database 710 to store the top-right sub-image 650 in the sub-image node 720. Finally, at step 970, the first instruction and the second instruction are transmitted to a database. For instance, the server 140 transmits the first instruction and the second instruction to the database 710.

In an example embodiment, an apparatus comprises: a receiver element configured to receive an image; and a processor element coupled to the receiver and configured to: obtain pixels of the image; reorder the pixels to create reordered pixels; generate a first sub-image and a second sub-image using the reordered pixels; generate a first instruction to store the first sub-image in a first sub-image node; and generate a second instruction to store the second sub-image in a second sub-image node; and a transmitter element coupled to the processor and configured to transmit the first instruction and the second instruction to a database.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
   a receiver configured to receive an image;
   a processor coupled to the receiver and configured to:
      obtain pixels of the image;
      reorder the pixels to create reordered pixels;
      generate a first sub-image and a second sub-image using the reordered pixels;
      generate a first instruction to store the first sub-image in a first sub-image node;
      generate a second instruction to store the second sub-image in a second sub-image node;
      generate a parity block using the first sub-image, the second sub-image, and a code; and
      generate a third instruction to store the parity block in a parity node; and
   a transmitter coupled to the processor and configured to transmit the first instruction and the second instruction to a database.

2. The apparatus of claim 1, wherein the pixels comprise a first pixel, a second pixel, and a third pixel, wherein the second pixel is adjacent to the first pixel, wherein the third pixel is adjacent to the second pixel but not adjacent to the first pixel, and wherein the processor is further configured to further generate the first sub-image using the first pixel and the third pixel.

3. The apparatus of claim 2, wherein the pixels further comprise a fourth pixel and a fifth pixel, wherein the fourth pixel is adjacent to the first pixel, wherein the fifth pixel is adjacent to the fourth pixel but not the first pixel, and wherein the processor is further configured to further generate the first sub-image using the fifth pixel.

4. The apparatus of claim 1, wherein the code is a Reed-Solomon (RS) code, a pyramid code, or a replication code.

5. The apparatus of claim 1, wherein the transmitter is further configured to transmit the third instruction to the database.

6. The apparatus of claim 1, wherein the receiver is further configured to receive a resolution reduction factor (RRF), and wherein the processor is further configured to generate a number of sub-images equal to the RRF.

7. The apparatus of claim 1, wherein the processor is further configured to determine a resolution reduction factor (RRF) based on resources available in the database, a user's data plan, or other criteria, and wherein the processor is further configured to generate a number of sub-images equal to the RRF.

8. The apparatus of claim 1, wherein the first sub-image and the second sub-image are each complete representations of the image.

9. The apparatus of claim 1, wherein the image comprises a first quadrant, a second quadrant, a third quadrant, a fourth quadrant, and wherein the first sub-image comprises a first pixel from the first quadrant, a second pixel from the second quadrant, a third pixel from the third quadrant, and a fourth pixel from the fourth quadrant.

10. A method comprising:
    receiving an image;
    obtaining pixels of the image;
    reordering the pixels to create reordered pixels;
    generating a first sub-image and a second sub-image using the reordered pixels;
    generating a first instruction to store the first sub-image in a first sub-image node;
    generating a second instruction to store the second sub-image in a second sub-image node;
    generating a parity block using the first sub-image, the second sub-image, and a code;
    generating a third instruction to store the parity block in a parity node; and
    transmitting the first instruction and the second instruction to a database.

11. The method of claim 10, wherein the pixels comprise a first pixel, a second pixel, and a third pixel, wherein the second pixel is adjacent to the first pixel, wherein the third pixel is adjacent to the second pixel but not adjacent to the first pixel, and wherein the method further comprises further generating the first sub-image using the first pixel and the third pixel.

12. The method of claim 11, wherein the pixels further comprise a fourth pixel and a fifth pixel, wherein the fourth pixel is adjacent to the first pixel, wherein the fifth pixel is adjacent to the fourth pixel but not the first pixel, and wherein the method further comprises further generating the first sub-image using the fifth pixel.

13. The method of claim 10, wherein the code is a Reed-Solomon (RS) code, a pyramid code, or a replication code.

14. The method of claim 10, further comprising transmitting the third instruction to the database.

15. The method of claim 10, further comprising:
    receiving a resolution reduction factor (RRF); and
    generating a number of sub-images equal to the RRF.

16. The method of claim 10, further comprising:
    determining a resolution reduction factor (RRF) based on resources available in the database, a user's data plan, or other criteria; and
    generating a number of sub-images equal to the RRF.

17. The method of claim 10, wherein the first sub-image and the second sub-image are each complete representations of the image.

18. The method of claim 17, wherein the image comprises a first quadrant, a second quadrant, a third quadrant, a fourth quadrant, and wherein the first sub-image comprises a first pixel from the first quadrant, a second pixel from the second quadrant, a third pixel from the third quadrant, and a fourth pixel from the fourth quadrant.

* * * * *